US012781010B2

(12) United States Patent
Gao et al.

(10) Patent No.: US 12,781,010 B2
(45) Date of Patent: Nov. 3, 2026

(54) SILICONE-BASED FOAM LAYER

(71) Applicant: SAINT-GOBAIN PERFORMANCE PLASTICS CORPORATION, Solon, OH (US)

(72) Inventors: Kai Gao, Natick, MA (US); Ying Wang, Westborough, MA (US); Shuai Liang, Southborough, MA (US); Arthur L. Adam, Jr., North Grosvenordale, CT (US); Jia Liu, Shrewsbury, MA (US); Cassandra Tubbs, Boylston, MA (US); Balaji Gopalan, Holden, MA (US); Aaron Kessman, Petersham, MA (US); Chuanping Li, Shrewsbury, MA (US); Fei Wang, Winchester, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 552 days.

(21) Appl. No.: 18/509,450

(22) Filed: Nov. 15, 2023

(65) Prior Publication Data

US 2024/0158594 A1 May 16, 2024

Related U.S. Application Data

(60) Provisional application No. 63/383,819, filed on Nov. 15, 2022.

(51) Int. Cl.
*C08J 9/00* (2006.01)
*C08G 77/08* (2006.01)
(Continued)

(52) U.S. Cl.
CPC ............ *C08J 9/0066* (2013.01); *C08G 77/08* (2013.01); *C08G 77/20* (2013.01); *C08J 9/142* (2013.01);
(Continued)

(58) Field of Classification Search
CPC ...... C08J 9/0066; C08J 9/142; C08J 2203/12; C08J 2383/07; C08J 9/0061; C08G 77/08;
(Continued)

(56) References Cited

U.S. PATENT DOCUMENTS 3,576,388 A 4/1971 Bruns
4,026,844 A 5/1977 Kittle et al.
(Continued)

FOREIGN PATENT DOCUMENTS

CA 2978358 A1 9/2016
CN 1144237 A 3/1997
(Continued)

OTHER PUBLICATIONS

Supplementary European Search Report for European Application No. 22817010.6, dated Mar. 24, 2025, 1 page.
(Continued)

*Primary Examiner* — K. Boyle
(74) *Attorney, Agent, or Firm* — Abel Schillinger, LLP; Chi Suk Kim

(57) ABSTRACT

The present disclosure related to a silicone-based foam may include a component A and a component B, where the component A may include a silicone-based matrix component, a first filler component that may include alumina trihydrate, a second filler component that may include perlite, and a third filler component that may include calcium carbonate, and where the component B may include a silicone-based matrix component, a first filler component that may include alumina trihydrate, a second filler compo-
(Continued)

100 nent that may include perlite, a third filler component that may include calcium carbonate, and a fourth filler component that may include zinc borate. The silicone-based foam may have a V-0 flammability rating as measured according to ASTM D3801.

20 Claims, 1 Drawing Sheet

(51) Int. Cl.

| | |
|---|---|
| ***C08G 77/20*** | (2006.01) |
| ***C08J 9/14*** | (2006.01) |
| ***C08K 3/22*** | (2006.01) |
| ***C08K 3/26*** | (2006.01) |
| ***C08K 3/34*** | (2006.01) |
| ***C08K 3/38*** | (2006.01) |

(52) U.S. Cl.

CPC .................. *C08K 3/22* (2013.01); *C08K 3/26* (2013.01); *C08K 3/34* (2013.01); *C08K 3/38* (2013.01); *C08J 2203/12* (2013.01); *C08J 2383/07* (2013.01); *C08K 2003/2227* (2013.01); *C08K 2003/265* (2013.01); *C08K 2003/387* (2013.01)

(58) Field of Classification Search

CPC . C08G 77/20; C08K 3/22; C08K 3/26; C08K 3/34; C08K 3/38; C08K 2003/2227; C08K 2003/265; C08K 2003/387; C08K 3/36; C08L 83/04

See application file for complete search history.

(56) References Cited

U.S. PATENT DOCUMENTS

| | | | | |
|---|---|---|---|---|
| 4,296,170 | A | 10/1981 | Ohashi et al. | |
| 4,368,279 | A | 1/1983 | Modic et al. | |
| 4,433,069 | A | 2/1984 | Harper | |
| 4,613,630 | A | 9/1986 | Bauman et al. | |
| 4,695,597 | A | 9/1987 | Seino | |
| 4,728,567 | A | 3/1988 | Razzano et al. | |
| 4,767,794 | A | 8/1988 | Modic et al. | |
| 4,822,659 | A | 4/1989 | Anderson et al. | |
| 4,865,907 | A | 9/1989 | Julis et al. | |
| 4,992,481 | A | 2/1991 | von Bonin et al. | |
| 5,061,736 | A | 10/1991 | Takahashi et al. | |
| 5,079,292 | A | 1/1992 | Hoffman et al. | |
| 5,162,397 | A | 11/1992 | Descamps et al. | |
| 5,358,975 | A | 10/1994 | Anderson | |
| 5,438,081 | A | 8/1995 | Lewis et al. | |
| 5,534,593 | A | 7/1996 | Friedman | |
| 5,733,946 | A | 3/1998 | Loiselle et al. | |
| RE35,771 | E | 4/1998 | Giesen | |
| 5,891,978 | A | 4/1999 | Brown et al. | |
| 5,951,959 | A | 9/1999 | Nishimura | |
| 6,010,763 | A | 1/2000 | Annemaier et al. | |
| 6,084,002 | A | 7/2000 | Nicholson et al. | |
| 7,285,334 | B1 | 10/2007 | Yamashita et al. | |
| 8,541,126 | B2 | 9/2013 | Hermann et al. | |
| 8,875,828 | B2 | 11/2014 | Rawlinson et al. | |
| 9,054,402 | B1 | 6/2015 | Rawlinson | |
| 9,142,829 | B2 | 9/2015 | Keyser et al. | |
| 9,646,774 | B2 | 5/2017 | Waterford et al. | |
| 10,116,016 | B2 | 10/2018 | Mott et al. | |
| 10,347,874 | B2 | 7/2019 | Yamamoto et al. | |
| 10,501,597 | B2 | 12/2019 | O'Neil et al. | |
| 10,726,974 | B1 | 7/2020 | Rogers | |
| 10,857,758 | B2 | 12/2020 | Doi et al. | |
| 2002/0006976 | A1 | 1/2002 | Subramonian et al. | |
| 2006/0155039 | A1* | 7/2006 | Alexander ............. | C09K 21/14 524/588 |
| 2007/0238008 | A1 | 10/2007 | Hogan et al. | |
| 2011/0192564 | A1 | 8/2011 | Mommer et al. | |
| 2011/0288210 | A1 | 11/2011 | Pinnavaia et al. | |
| 2012/0003457 | A1 | 1/2012 | Hatanaka et al. | |
| 2012/0040138 | A1 | 2/2012 | Weidinger et al. | |
| 2012/0128959 | A1 | 5/2012 | Fernando et al. | |
| 2014/0249257 | A1* | 9/2014 | Rerat ..................... | C08G 77/28 524/211 |
| 2014/0335381 | A1 | 11/2014 | Krolak | |
| 2014/0335398 | A1 | 11/2014 | Partin et al. | |
| 2015/0068691 | A1 | 3/2015 | Thomas et al. | |
| 2015/0093629 | A1 | 4/2015 | Sayre et al. | |
| 2016/0126535 | A1 | 5/2016 | Qiao et al. | |
| 2017/0098806 | A1 | 4/2017 | Bowersock et al. | |
| 2017/0125759 | A1 | 5/2017 | Silkowski et al. | |
| 2017/0313941 | A1 | 11/2017 | Atluri | |
| 2018/0047959 | A1 | 2/2018 | Kruger | |
| 2018/0048036 | A1 | 2/2018 | Melack et al. | |
| 2018/0048037 | A1 | 2/2018 | Newman | |
| 2018/0111349 | A1 | 4/2018 | Polidore et al. | |
| 2019/0001618 | A1 | 1/2019 | Doi et al. | |
| 2019/0140233 | A1 | 5/2019 | Yeh | |
| 2020/0109245 | A1 | 4/2020 | Iseki et al. | |
| 2020/0224010 | A1 | 7/2020 | Beaudry et al. | |
| 2020/0335737 | A1 | 10/2020 | Hilligoss et al. | |
| 2021/0317281 | A1 | 10/2021 | Broderick et al. | |
| 2022/0169814 | A1 | 6/2022 | Wu et al. | |
| 2022/0294044 | A1 | 9/2022 | Kristy et al. | |
| 2022/0388291 | A1* | 12/2022 | Wang ........................ | B32B 5/18 |
| 2022/0389152 | A1 | 12/2022 | Wang et al. | |
| 2024/0157685 | A1 | 5/2024 | Gao et al. | |
| 2024/0279422 | A1 | 8/2024 | Wang et al. | |
| 2025/0162282 | A1 | 5/2025 | Kagumba et al. | |

FOREIGN PATENT DOCUMENTS

| | | | |
|---|---|---|---|
| CN | 101845223 | A | 9/2010 |
| CN | 102504546 | A | 6/2012 |
| CN | 103881386 | A | 6/2014 |
| CN | 105229819 | A | 1/2016 |
| CN | 105229846 | A | 1/2016 |
| CN | 105585725 | A | 5/2016 |
| CN | 105633502 | A | 6/2016 |
| CN | 105742755 | A | 7/2016 |
| CN | 105778511 | A | 7/2016 |
| CN | 205406679 | U | 7/2016 |
| CN | 105845994 | A | 8/2016 |
| CN | 205543137 | U | 8/2016 |
| CN | 105954678 | A | 9/2016 |
| CN | 106066457 | A | 11/2016 |
| CN | 205680751 | U | 11/2016 |
| CN | 205811021 | U | 12/2016 |
| CN | 205942361 | U | 2/2017 |
| CN | 206012357 | U | 3/2017 |
| CN | 106569142 | A | 4/2017 |
| CN | 106571662 | A | 4/2017 |
| CN | 106589954 | A | 4/2017 |
| CN | 106597299 | A | 4/2017 |
| CN | 106682288 | A | 5/2017 |
| CN | 106707191 | A | 5/2017 |
| CN | 106784567 | A | 5/2017 |
| CN | 106785228 | A | 5/2017 |
| CN | 106816655 | A | 6/2017 |
| CN | 106816668 | A | 6/2017 |
| CN | 107015161 | A | 8/2017 |
| CN | 107068959 | A | 8/2017 |
| CN | 107069140 | A | 8/2017 |
| CN | 107078364 | A | 8/2017 |
| CN | 206379410 | U | 8/2017 |
| CN | 107180934 | A | 9/2017 |
| CN | 206878137 | U | 1/2018 |
| CN | 107732035 | A | 2/2018 |
| CN | 107732368 | A | 2/2018 |
| CN | 107805391 | A | 3/2018 |
| CN | 207069025 | U | 3/2018 |
| CN | 208538928 | U | 2/2019 |
| CN | 109509928 | A | 3/2019 |
| CN | 109575602 | A | 4/2019 |
| CN | 110551397 | A | 12/2019 |
| CN | 112358731 | A | 2/2021 |

(56) References Cited

FOREIGN PATENT DOCUMENTS

| | | | | |
|---|---|---|---|---|
| CN | 108276774 | B | 3/2021 | |
| CN | 113122001 | A | 7/2021 | |
| CN | 112111159 | A | 12/2022 | |
| CN | 116218459 | A | 6/2023 | |
| EP | 1102336 | A1 | 5/2001 | |
| EP | 0742295 | B1 | 8/2001 | |
| JP | S57180642 | A | 11/1982 | |
| JP | H03106945 | A | 5/1991 | |
| JP | 5662329 | B2 | 1/2015 | |
| JP | 2015527478 | A | 9/2015 | |
| JP | 2016035817 | A | 3/2016 | |
| JP | 2016092007 | A | 5/2016 | |
| JP | 2018145323 | A | 9/2018 | |
| JP | 2018206605 | A | 12/2018 | |
| JP | 2019196420 | A | 11/2019 | |
| JP | 2024509596 | A | 3/2024 | |
| KR | 20040090888 | A | 10/2004 | |
| KR | 20100106929 | A | 10/2010 | |
| KR | 101984203 | B1 | 5/2019 | |
| KR | 102043429 | B1 | 11/2019 | |
| TW | M556938 | U | 3/2018 | |
| WO | 2010056541 | A1 | 5/2010 | |
| WO | 2010109218 | A1 | 9/2010 | |
| WO | WO-2013072371 | A1 * | 5/2013 | ........... C09D 183/08 |
| WO | 2014039414 | A1 | 3/2014 | |
| WO | 2018031077 | A1 | 2/2018 | |
| WO | 2019111816 | A1 | 6/2019 | |
| WO | 2019126681 | A1 | 6/2019 | |
| WO | 2021176372 | A1 | 9/2021 | |
| WO | 2021199710 | A1 | 10/2021 | |
| WO | 2022197405 | A1 | 9/2022 | |
| WO | 2022256780 | A1 | 12/2022 | |
| WO | 2022256781 | A1 | 12/2022 | |
| WO | 2024107785 | A1 | 5/2024 | |
| WO | 2024107789 | A1 | 5/2024 | |
| WO | 2024173846 | A1 | 8/2024 | |

OTHER PUBLICATIONS

Supplementary European Search Report for European Application No. 22817011.4, dated Feb. 19, 2025, 2 pages.

International Search Report and Written Opinion for PCT Application No. PCT/US2024/016234, dated Jun. 10, 2024, 10 pages.

International Search Report and Written Opinion for PCT Application No. PCT/US2022/072578, dated Sep. 19, 2022, 10 pages.

International Search Report and Written Opinion for PCT Application No. PCT/US2022/072580, dated Sep. 16, 2022, 10 pages.

Hayashida, Kenichi et al., "Flame Retardant Mechanism of Polydimethylsiloxane Material Containing Platinum Compound Studied by Analytical Pyrolysis Techniques and Alkaline Hydrolysis Gas Chromatography," Polymer, 2003, vol. 44, No. 19, pp. 5611-5616.

International Search Report and Written Opinion for PCT Application No. PCT/US2023/079725, dated Mar. 22, 2024, 9 pages.

International Search Report and Written Opinion for PCT Application No. PCT/US2023/079730, dated Mar. 22, 2024, 11 pages.

Gao, Meilan et al., "Fundamentals of Engineering Materials and Heat Treatment (2nd Edition)," Machinery Industry Press, 2021, pp. 133-134. (with English translation).

Ou, Yuxiang, "Flame retardant," National Defense Industry Press, 2009, p. 57. (with English translation).

Xu, Tongkao, "Practical technologies for plastic modification," China Light Industry Press, 2012, p. 125. (with English translation).

Supplementary European Search Report for European Application No. 23892446.8, dated Jul. 13, 2026, 1 page.

* cited by examiner

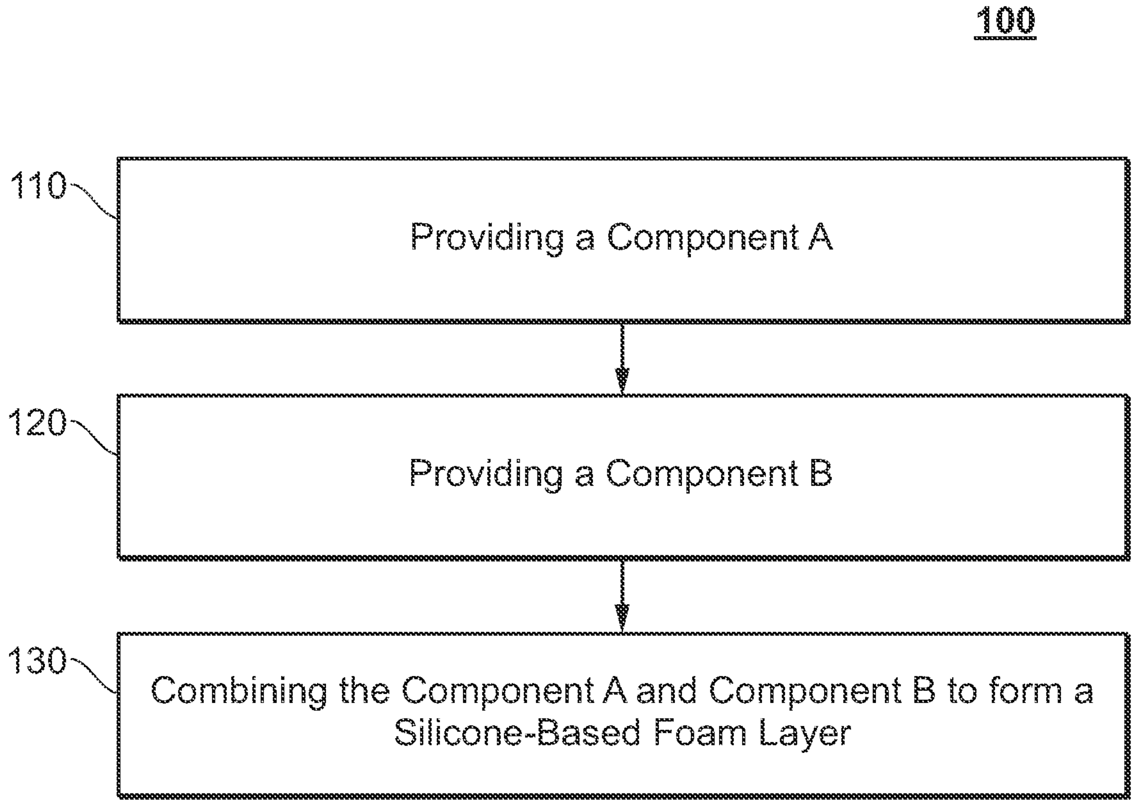
100
110
Providing a Component A
120
Providing a Component B
130
Combining the Component A and Component B to form a Silicone-Based Foam Layer

SILICONE-BASED FOAM LAYER

CROSS-REFERENCE TO RELATED APPLICATION(S)

This Application claims priority under 35 U.S.C. § 119(e) to U.S. Provisional Patent Application No. 63/383,819, entitled "SILICONE-BASED FOAM LAYER," filed on Nov. 15, 2022, by Kai GAO et al., which is assigned to the current assignee hereof and is incorporated herein by reference in its entirety.

FIELD OF THE DISCLOSURE

The present disclosure relates to a silicone-based foam layer and, in particular, a silicone-based foam layer with heat resistant properties, and methods of forming the same.

BACKGROUND

Foam layer and/or films may be designed for high temperature protection in various applications, for example, for use as thermal barriers in electric vehicle battery packs, thermal barrier coverings in high temperature cable protection, thermal barrier containers for thermal spray containment, etc. However, in these, and in other applications, potential heat growth continues to increase due to improvements in technology. Accordingly, there is a continuing need for improved barrier designs that protect against such high heat potential.

SUMMARY

According to a first aspect, a silicone-based foam may include a component A and a component B. The component A may include a silicone-based matrix component, a first filler component that may include alumina trihydrate at a content of at least about 5 wt. % and not greater than about 30 wt. % for a total weight of the component A, a second filler component that may include perlite at a content of at least about 1 wt. % and not greater than about 15 wt. % for a total weight of the component A, and a third filler component that may include calcium carbonate at a content of at least about 1 wt. % and not greater than about 20 wt. % for a total weight of the component A. The component B may include a silicone-based matrix component, a first filler component that may include alumina trihydrate at a content of at least about 5 wt. % and not greater than about 30 wt. % for a total weight of the component B, a second filler component that may include perlite at a content of at least about 1 wt. % and not greater than about 15 wt. % for a total weight of the component B, a third filler component that may include calcium carbonate at a content of at least about 1 wt. % and not greater than about 20 wt. % for a total weight of the component B, and a fourth filler component that may include zinc borate at a content of at least about 1 wt. % and not greater than about 20 wt. % for a total weight of the component B. The silicone-based foam may have a V-0 flammability rating as measured according to ASTM D3801.

According to another aspect, a silicone-based foam may include a silicone-based matrix component, a first filler component may include alumina trihydrate at a content of at least about 5 wt. % and not greater than about 30 wt. % for a total weight of the silicone-based foam, a second filler component may include perlite at a content of at least about 1 wt. % and not greater than about 15 wt. % for a total weight of the silicone-based foam, a third filler component may include calcium carbonate at a content of at least about 1 wt. % and not greater than about 20 wt. % for a total weight of the silicone-based foam, and a fourth filler component may include zinc borate at a content of at least about 1 wt. % and not greater than about 10 wt. % for a total weight of the silicone-based foam. The silicone-based foam may have a V-0 flammability rating as measured according to ASTM D3801.

According to still another aspect, a silicone-based foam may be formed from a component A and a component B. The component A may include a silicone-based matrix component, a first filler component that may include alumina trihydrate at a content of at least about 5 wt. % and not greater than about 30 wt. % for a total weight of the component A, a second filler component that may include perlite at a content of at least about 1 wt. % and not greater than about 15 wt. % for a total weight of the component A, and a third filler component that may include calcium carbonate at a content of at least about 1 wt. % and not greater than about 20 wt. % for a total weight of the component A. The component B may include a silicone-based matrix component, a first filler component that may include alumina trihydrate at a content of at least about 5 wt. % and not greater than about 30 wt. % for a total weight of the component B, a second filler component that may include perlite at a content of at least about 1 wt. % and not greater than about 15 wt. % for a total weight of the component B, a third filler component that may include calcium carbonate at a content of at least about 1 wt. % and not greater than about 20 wt. % for a total weight of the component B, and a fourth filler component that may include zinc borate at a content of at least about 1 wt. % and not greater than about 20 wt. % for a total weight of the component B. The silicone-based foam may have a V-0 flammability rating as measured according to ASTM D3801.

BRIEF DESCRIPTION OF THE DRAWINGS

Embodiments are illustrated by way of example and are not limited to the accompanying FIGURE.

FIG. 1 includes a diagram showing a silicone-based foam forming method according to embodiments described herein.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a silicone-based foam layer that may include a silicone-based matrix component, a first filler component, a second filler component, a third filler component and fourth filler component. According to still other embodiments, the foam layer may demonstrate improved flame resistance performance.

Referring first to a method of forming a silicone-based foam layer, FIG. 1 includes a diagram showing a forming method 100 for forming a multilayer laminate structure according to embodiments described herein. According to particular embodiments, the forming method 100 may include a first step 110 of providing a component A, a second step 120 of providing a component B, and a third step 130 of combining the component A and component B to form a silicone-based foam layer.

Referring to first step 110, the component A may include a silicone-based matrix component, a first filler component, a second filler component, and a third filler component.

According to particular embodiments, the silicone-based matrix component of the component A may include additional components. For example, the silicone-based matrix component may include platinum (Pt). According to still other embodiments, the silicone-based be a platinum catalyzed silicone-based matrix component. According to still other embodiments, the silicone-based matrix component of the component A may include peroxide. According to still other embodiments, the silicone-based may be a peroxide catalyzed silicone-based matrix component. According to still other embodiments, the silicone-based matrix component of the component A may include tin. According to yet other embodiments, the silicone-based matrix component of the component A may include tin catalyzed silicone-based matrix component. According to still other embodiments, the silicone-based matrix component of the component A may include tris(pentafluorophenyl) borane. According to still other embodiments, the silicone-based matrix component of the component A may include a transient basic catalyst. According to still other embodiments, the silicone-based matrix component of the component A may include phosphoronitrile chloride. According to still other embodiments, the silicone-based matrix component of the component A may include ruthenium.

According to certain embodiments, the component A may include a particular content of the silicone-based matrix component. For example, the component A may include a silicone-based matrix component content of at least about 30 wt. % for a total weight of the component A, such as, at least about 32 wt. % or at least about 35 wt. % or at least about 37 wt. % or at least about 40 wt. % or at least about 42 wt. % or even at least about 45 wt. %. According to yet other embodiments, the component A may include a silicone-based matrix component content of not greater than about 60 wt. % for a total weight of the component A, such as, not greater than about 58 wt. % or not greater than about 55 wt. % or not greater than about 53 wt. % or even not greater than about 50 wt. %. It will be appreciated that the silicone-based matrix component content of the component A may be within a range between any of the values noted above. It will be further appreciated that the silicone-based matrix component content of the component A may be any value between any of the minimum and maximum values noted above.

According to certain embodiments, the first filler component of the component A may include alumina trihydrate. According to still other embodiments, the first filler component of the component A may consist of alumina trihydrate. According to yet other embodiments, the first filler component of the component A may be an alumina trihydrate filler.

According to other embodiments, the component A may include a particular content of the first filler component. For example, the component A may include a first filler component content of at least about 5.0 wt. % for a total weight of the component A, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component A may include a first filler component content of not greater than about 30.0 wt. % for a total weight of the component A, such as, not greater than about 28.0 wt. % or not greater than about 26.0 wt. % or not greater than about 24.0 wt. % or even not greater than about 22.0 wt. %. It will be appreciated that the first filler component content of the component A may be within a range between any of the values noted above. It will be further appreciated that the first filler component content of the component A may be any value between any of the minimum and maximum values noted above.

According to other embodiments, the component A may include a particular content of alumina trihydrate. For example, the component A may include an alumina trihydrate content of at least about 5.0 wt. % for a total weight of the component A, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component A may include an alumina trihydrate content of not greater than about 30.0 wt. % for a total weight of the component A, such as, not greater than about 28.0 wt. % or not greater than about 26.0 wt. % or not greater than about 24.0 wt. % or even not greater than about 22.0 wt. %. It will be appreciated that the alumina trihydrate content of the component A may be within a range between any of the values noted above. It will be further appreciated that the alumina trihydrate content of the component A may be any value between any of the minimum and maximum values noted above.

According to still other embodiments, the second filler component of the component A may include perlite. According to still other embodiments, the second filler component of the component A may consist of perlite. According to yet other embodiments, the second filler component of the component A may be a perlite filler.

According to other embodiments, the component A may include a particular content of the second filler component. For example, the component A may include a second filler component content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a second filler component content of not greater than about 15.0 wt. % for a total weight of the component A, such as, not greater than about 14.0 wt. % or not greater than about 13.0 wt. % or not greater than about 12.0 wt. % or even not greater than about 11.0 wt. %. It will be appreciated that the second filler component content of the component A may be within a range between any of the values noted above. It will be further appreciated that the second filler component content of the component A may be any value between any of the minimum and maximum values noted above.

According to other embodiments, the component A may include a particular content of perlite. For example, the component A may include a perlite content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a perlite content of not greater than about 15.0 wt. % for a total weight of the component A, such as, not greater than about 14.0 wt. % or not greater than about 13.0 wt. % or not greater than about 12.0 wt. % or even not greater than about 11.0 wt. %. It will be appreciated that the perlite content of the component A may be within a range between any of the values noted above. It will be further appreciated that the perlite content of the component A may be any value between any of the minimum and maximum values noted above.

According to still other embodiments, the third filler component of the component A may include calcium carbonate. According to still other embodiments, the third filler component of the component A may consist of calcium carbonate. According to yet other embodiments, the third filler component of the component A may be a calcium carbonate filler.

According to other embodiments, the component A may include a particular content of the third filler component. For example, the component A may include a third filler component content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a third filler component content of not greater than about 20.0 wt. % for a total weight of the component A, such as, not greater than about 18.0 wt. % or not greater than about 16.0 wt. % or not greater than about 14 wt. % or even not greater than about 12.0 wt. %. It will be appreciated that the third filler component content of the component A may be within a range between any of the values noted above. It will be further appreciated that the third filler component content of the component A may be any value between any of the minimum and maximum values noted above.

According to other embodiments, the component A may include a particular content of calcium carbonate. For example, the component A may include a calcium carbonate content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a calcium carbonate content of not greater than about 20.0 wt. % for a total weight of the component A, such as, not greater than about 18.0 wt. % or not greater than about 16.0 wt. % or not greater than about 14 wt. % or even not greater than about 12.0 wt. %. It will be appreciated that the calcium carbonate content of the component A may be within a range between any of the values noted above. It will be further appreciated that the calcium carbonate content of the component A may be any value between any of the minimum and maximum values noted above.

According to still other embodiments, the component A may further include a pigment component.

According to other embodiments, the component A may include a particular content of the pigment component. For example, the component A may include a pigment component content of at least about 1.0 wt. % for a total weight of the component A, such as, at least about 1.5 wt. % or at least about 2.0 wt. % or even at least about 2.5 wt. %. According to yet other embodiments, the component A may include a pigment component content of not greater than about 5.0 wt. % for a total weight of the component A, such as, not greater than about 4.5 wt. % or not greater than about 4.0 wt. % or not greater than about 3.5 wt. % or even not greater than about 3.0 wt. %. It will be appreciated that the pigment component content of the component A may be within a range between any of the values noted above. It will be further appreciated that the pigment component content of the component A may be any value between any of the minimum and maximum values noted above.

According to still other embodiments, the component A may further include a vinyl-functional pre-polymer component.

According to other embodiments, the component A may include a particular content of the vinyl-functional pre-polymer component. For example, the component A may include a vinyl-functional pre-polymer component content of at least about 10.0 wt. % for a total weight of the component A, such as, at least about 11.0 wt. % or at least about 12.0 wt. % or at least about 13.0 wt. % or at least about 14.0 wt. % or at least about 15.0 wt. % or at least about 16.0 wt. % or at least about 17.0 wt. % or at least about 18.0 wt. % or at least about 19.0 wt. % or even at least about 20.0 wt. %. According to yet other embodiments, the component A may include a vinyl-functional pre-polymer component content of not greater than about 30.0 wt. % for a total weight of the component A, such as, not greater than about 29.0 wt. % or not greater than about 28.0 wt. % or not greater than about 27.0 wt. % or even not greater than about 26.0 wt. %. It will be appreciated that the vinyl-functional pre-polymer component content of the component A may be within a range between any of the values noted above. It will be further appreciated that the vinyl-functional pre-polymer component content of the component A may be any value between any of the minimum and maximum values noted above.

According to still other embodiments, the component A may further include an alcohol-blowing agent.

According to other embodiments, the component A may include a particular content of the alcohol-blowing agent. For example, the component A may include an alcohol blowing agent content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or even at least about 4.5 wt. %. According to yet other embodiments, the component A may include an alcohol blowing agent content of not greater than about 10.0 wt. % for a total weight of the component A, such as, not greater than about 9.5 wt. % or not greater than about 9.0 wt. % or not greater than about 8.5 wt. % or even not greater than about 8.0 wt. %. It will be appreciated that the alcohol blowing agent content of the component A may be within a range between any of the values noted above. It will be further appreciated that the alcohol blowing agent content of the component A may be any value between any of the minimum and maximum values noted above.

According to still other embodiments, the component A may further include a resin solution.

According to other embodiments, the component A may include a particular content of the resin solution. For example, the component A may include a resin solution content of at least about 5.0 wt. % for a total weight of the component A, such as, at least about 6.0 wt. % or at least about 7.0 wt. % or at least about 8.0 wt. % or at least about 9.0 wt. % or at least about 10.0 wt. % or at least about 11.0 wt. % or at least about 12.0 wt. % or even at least about 13.0 wt. %. According to yet other embodiments, the component A may include a resin solution content of not greater than about 25.0 wt. % for a total weight of the component A, such as, not greater than about 24.0 wt. % or not greater than about 23.0 wt. % or not greater than about 22.0 wt. % or even not greater than about 21.0 wt. %. It will be appreciated that the resin solution content of the component A may be within a range between any of the values noted above. It will be further appreciated that the resin solution content of the component A may be any value between any of the minimum and maximum values noted above.

According to still other embodiments, the component A may further include a PT catalyst component.

According to other embodiments, the component A may include a particular content of the PT catalyst component. For example, the component A may include a PT catalyst component content of at least about 0.02 wt. % for a total weight of the component A, such as, at least about 0.04 wt. % or at least about 0.06 wt. % or at least about 0.08 wt. % or even at least about 0.1 wt. %. According to yet other embodiments, the component A may include a PT catalyst component content of not greater than about 0.15 wt. % for a total weight of the component A, such as, not greater than about 0.14 wt. % or not greater than about 0.13 wt. % or not greater than about 0.12 wt. % or even not greater than about 0.11 wt. %. It will be appreciated that the PT catalyst component content of the component A may be within a range between any of the values noted above. It will be further appreciated that the PT catalyst component content of the component A may be any value between any of the minimum and maximum values noted above.

Referring to second step 120, the component B may include a silicone-based matrix component, a first filler component, a second filler component, a third filler component, and a fourth filler component.

According to particular embodiments, the silicone-based matrix component of the component B may include platinum catalyzed addition cured silicone foam. According to still other embodiments, the silicone-based matrix component of the component B may include additional components. For example, the silicone-based matrix component may include platinum (Pt). According to still other embodiments, the silicone-based may be a platinum catalyzed silicone-based matrix component. According to still other embodiments, the silicone-based matrix component of the component B may include peroxide. According to still other embodiments, the silicone-based may be a peroxide catalyzed silicone-based matrix component. According to still other embodiments, the silicone-based matrix component of the component B may include tin. According to yet other embodiments, the silicone-based matrix component of the component B may include tin catalyzed silicone-based matrix component. According to still other embodiments, the silicone-based matrix component of the component B may include tris(pentafluorophenyl) borane. According to still other embodiments, the silicone-based matrix component of the component B may include a transient basic catalyst. According to still other embodiments, the silicone-based matrix component of the component B may include phosphoronitrile chloride. According to still other embodiments, the silicone-based matrix component of the component B may include ruthenium.

According to certain embodiments, the component B may include a particular content of the silicone-based matrix component. For example, the component B may include a silicone-based matrix component content of at least about 20 wt. % for a total weight of the component B, such as, at least about 22 wt. % or at least about 25 wt. % or at least about 27 wt. % or at least about 30 wt. % or at least about 32 wt. % or even at least about 35 wt. %. According to yet other embodiments, the component B may include a silicone-based matrix component content of not greater than about 50 wt. % for a total weight of the component B, such as, not greater than about 48 wt. % or not greater than about 45 wt. % or not greater than about 43 wt. % or even not greater than about 40 wt. %. It will be appreciated that the silicone-based matrix component content of the component B may be within a range between any of the values noted above. It will be further appreciated that the silicone-based matrix component content of the component B may be any value between any of the minimum and maximum values noted above.

According to certain embodiments, the first filler component of the component B may include alumina trihydrate. According to still other embodiments, the first filler component of the component B may consist of alumina trihydrate. According to yet other embodiments, the first filler component of the component B may be an alumina trihydrate filler.

According to other embodiments, the component B may include a particular content of the first filler component. For example, the component B may include a first filler component content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component B may include a first filler component content of not greater than about 30.0 wt. % for a total weight of the component B, such as, not greater than about 25.0 wt. % or not greater than about 20.0 wt. % or not greater than about 15.0 wt. % or even not greater than about 10.0 wt. %. It will be appreciated that the first filler component content of the component B may be within a range between any of the values noted above. It will be further appreciated that the first filler component content of the component B may be any value between any of the minimum and maximum values noted above.

According to other embodiments, the component B may include a particular content of alumina trihydrate. For example, the component B may include an alumina trihydrate content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component B may include an alumina trihydrate content of not greater than about 30.0 wt. % for a total weight of the component B, such as, not greater than about 25.0 wt. % or not greater than about 20.0 wt. % or not greater than about 15.0 wt. % or even not greater than about 10.0 wt. %. It will be appreciated that the alumina trihydrate content of the component B may be within a range between any of the values noted above. It will be further appreciated that the alumina trihydrate content of the component B may be any value between any of the minimum and maximum values noted above.

According to still other embodiments, the second filler component of the component B may include perlite. According to still other embodiments, the second filler component of the component B may consist of perlite. According to yet other embodiments, the second filler component of the component B may be a perlite filler.

According to other embodiments, the component B may include a particular content of the second filler component. For example, the component B may include a second filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a second filler component content of not greater than about 15.0 wt. % for a total weight of the component B, such as, not greater than about 14.0 wt. % or not greater than about 13.0 wt. % or not greater than about 12.0 wt. % or even not greater than about 11.0 wt. %. It will be appreciated that the second filler component content of the component B may be within a range between any of the values noted above. It will be further appreciated that the second filler component content of the component B may be any value between any of the minimum and maximum values noted above.

According to other embodiments, the component B may include a particular content of perlite. For example, the component B may include a perlite content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a perlite content of not greater than about 15.0 wt. % for a total weight of the component B, such as, not greater than about 14.0 wt. % or not greater than about 13.0 wt. % or not greater than about 12.0 wt. % or even not greater than about 11.0 wt. %. will be appreciated that the perlite content of the component B may be within a range between any of the values noted above. It will be further appreciated that the perlite content of the component B may be any value between any of the minimum and maximum values noted above.

According to still other embodiments, the third filler component of the component B may include calcium carbonate. According to still other embodiments, the third filler component of the component B may consist of calcium carbonate. According to yet other embodiments, the third filler component of the component B may be a calcium carbonate filler.

According to other embodiments, the component B may include a particular content of the third filler component. For example, the component B may include a third filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a third filler component content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the third filler component content of the component B may be within a range between any of the values noted above. It will be further appreciated that the third filler component content of the component B may be any value between any of the minimum and maximum values noted above.

According to other embodiments, the component B may include a particular content of calcium carbonate. For example, the component B may include a calcium carbonate content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a calcium carbonate content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the calcium carbonate content of the component B may be within a range between any of the values noted above. It will be further appreciated that the calcium carbonate content of the component B may be any value between any of the minimum and maximum values noted above.

According to still other embodiments, the fourth filler component of the component B may include zinc borate. According to still other embodiments, the fourth filler component of the component B may consist of zinc borate. According to yet other embodiments, the fourth filler component of the component B may be a zinc borate filler.

According to other embodiments, the component B may include a particular content of the fourth filler component. For example, the component B may include a fourth filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a fourth filler component content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the fourth filler component content of the component B may be within a range between any of the values noted above. It will be further appreciated that the fourth filler component content of the component B may be any value between any of the minimum and maximum values noted above.

According to other embodiments, the component B may include a particular content of zinc borate. For example, the component B may include a zinc borate content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a zinc borate content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the zinc borate content of the component B may be within a range between any of the values noted above. It will be further appreciated that the zinc borate content of the component B may be any value between any of the minimum and maximum values noted above.

According to still other embodiments, the component B may further include a vinyl-functional pre-polymer component.

According to other embodiments, the component B may include a particular content of the vinyl-functional pre-polymer component. For example, the component B may include a vinyl-functional pre-polymer component content of at least about 10.0 wt. % for a total weight of the component B, such as, at least about 11.0 wt. % or at least about 12.0 wt. % or at least about 13.0 wt. % or at least about 14.0 wt. % or at least about 15.0 wt. % or at least about 16.0 wt. % or at least about 17.0 wt. % or at least about 18.0 wt. % or at least about 19.0 wt. % or even at least about 20.0 wt. %. According to yet other embodiments, the component B may include a vinyl-functional pre-polymer component content of not greater than about 25.0 wt. % for a total weight of the component B, such as, not greater than about 24.0 wt. % or not greater than about 23.0 wt. % or not greater than about 22.0 wt. % or even not greater than about 21.0 wt. %. It will be appreciated that the vinyl-functional pre-polymer component content of the component B may be within a range between any of the values noted above. It will be further appreciated that the vinyl-functional pre-polymer component content of the component B may be any value between any of the minimum and maximum values noted above.

According to still other embodiments, the component B may further include a hydride functional crosslinker.

According to other embodiments, the component B may include a particular content of the hydride functional crosslinker. For example, the component B may include a hydride functional crosslinker content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or even at least about 9.0 wt. %. According to yet other embodiments, the component B may include a hydride functional crosslinker content of not greater than about 15.0 wt. % for a total weight of the component B, such as, not greater than about 14.5 wt. % or not greater than about 14.0 wt. % or not greater than about 13.5 wt. % or even not greater than about 13.0 wt. %. It will be appreciated that the hydride functional crosslinker content of the component B may be within a range between any of the values noted above. It will be further appreciated that the hydride functional crosslinker content of the component B may be any value between any of the minimum and maximum values noted above.

According to still other embodiments, the component B may further include an Inhibitor component.

According to other embodiments, the component B may include a particular content of the inhibitor component. For example, the component B may include an inhibitor component content of at least about 0.02 wt. % for a total weight of the component B, such as, at least about 0.04 wt. % or at least about 0.06 wt. % or at least about 0.08 wt. % or even at least about 0.1 wt. %. According to yet other embodiments, the component B may include an inhibitor component content of not greater than about 0.15 wt. % for a total weight of the component B, such as, not greater than about 0.14 wt. % or not greater than about 0.13 wt. % or not greater than about 0.12 wt. % or even not greater than about 0.11 wt. %. It will be appreciated that the inhibitor component content of the component B may be within a range between any of the values noted above. It will be further appreciated that the inhibitor component content of the component B may be any value between any of the minimum and maximum values noted above.

Referring now to embodiments of the silicone-based foam formed according to forming method 100, the silicone-based foam may be described as including a component A and a component B.

Referring to the component A of the silicone-based foam, the component A may include a silicone-based matrix component, a first filler component, a second filler component, and a third filler component.

According to particular embodiments, the silicone-based matrix component of the component A may include additional components. For example, the silicone-based matrix component may include platinum (Pt). According to still other embodiments, the silicone-based be a platinum catalyzed silicone-based matrix component. According to still other embodiments, the silicone-based matrix component of the component A may include peroxide. According to still other embodiments, the silicone-based may be a peroxide catalyzed silicone-based matrix component. According to still other embodiments, the silicone-based matrix component of the component A may include tin. According to yet other embodiments, the silicone-based matrix component of the component A may include tin catalyzed silicone-based matrix component. According to still other embodiments, the silicone-based matrix component of the component A may include tris(pentafluorophenyl) borane. According to still other embodiments, the silicone-based matrix component of the component A may include a transient basic catalyst. According to still other embodiments, the silicone-based matrix component of the component A may include phosphoronitrile chloride. According to still other embodiments, the silicone-based matrix component of the component A may include ruthenium.

According to certain embodiments, the component A may include a particular content of the silicone-based matrix component. For example, the component A may include a silicone-based matrix component content of at least about 30 wt. % for a total weight of the component A, such as, at least about 32 wt. % or at least about 35 wt. % or at least about 37 wt. % or at least about 40 wt. % or at least about 42 wt. % or even at least about 45 wt. %. According to yet other embodiments, the component A may include a silicone-based matrix component content of not greater than about 60 wt. % for a total weight of the component A, such as, not greater than about 58 wt. % or not greater than about 55 wt. % or not greater than about 53 wt. % or even not greater than about 50 wt. %. It will be appreciated that the silicone-based matrix component content of the component A may be within a range between any of the values noted above. It will be further appreciated that the silicone-based matrix component content of the component A may be any value between any of the minimum and maximum values noted above.

According to certain embodiments, the first filler component of the component A may include alumina trihydrate. According to still other embodiments, the first filler component of the component A may consist of alumina trihydrate. According to yet other embodiments, the first filler component of the component A may be an alumina trihydrate filler.

According to other embodiments, the component A may include a particular content of the first filler component. For example, the component A may include a first filler component content of at least about 5.0 wt. % for a total weight of the component A, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component A may include a first filler component content of not greater than about 30.0 wt. % for a total weight of the component A, such as, not greater than about 28.0 wt. % or not greater than about 26.0 wt. % or not greater than about 24.0 wt. % or even not greater than about 22.0 wt. %. It will be appreciated that the first filler component content of the component A may be within a range between any of the values noted above. It will be further appreciated that the first filler component content of the component A may be any value between any of the minimum and maximum values noted above.

According to other embodiments, the component A may include a particular content of alumina trihydrate. For example, the component A may include an alumina trihydrate content of at least about 5.0 wt. % for a total weight of the component A, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component A may include an alumina trihydrate content of not greater than about 30.0 wt. % for a total weight of the component A, such as, not greater than about 28.0 wt. % or not greater than about 26.0 wt. % or not greater than about 24.0 wt. % or even not greater than about 22.0 wt. %. It will be appreciated that the alumina trihydrate content of the component A may be within a range between any of the values noted above. It will be further appreciated that the alumina trihydrate content of the component A may be any value between any of the minimum and maximum values noted above.

According to still other embodiments, the second filler component of the component A may include perlite. According to still other embodiments, the second filler component of the component A may consist of perlite. According to yet other embodiments, the second filler component of the component A may be a perlite filler.

According to other embodiments, the component A may include a particular content of the second filler component. For example, the component A may include a second filler component content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a second filler component content of not greater than about 15.0 wt. % for a total weight of the component A, such as, not greater than about 14.0 wt. % or not greater than about 13.0 wt. % or not greater than about 12.0 wt. % or even not greater than about 11.0 wt. %. It will be appreciated that the second filler component content of the component A may be within a range between any of the values noted above. It will be further appreciated that the second filler component content of the component A may be any value between any of the minimum and maximum values noted above.

According to other embodiments, the component A may include a particular content of perlite. For example, the component A may include a perlite content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a perlite content of not greater than about 15.0 wt. % for a total weight of the component A, such as, not greater than about 14.0 wt. % or not greater than about 13.0 wt. % or not greater than about 12.0 wt. % or even not greater than about 11.0 wt. %. It will be appreciated that the perlite content of the component A may be within a range between any of the values noted above. It will be further appreciated that the perlite content of the component A may be any value between any of the minimum and maximum values noted above.

According to still other embodiments, the third filler component of the component A may include calcium carbonate. According to still other embodiments, the third filler component of the component A may consist of calcium carbonate. According to yet other embodiments, the third filler component of the component A may be a calcium carbonate filler.

According to other embodiments, the component A may include a particular content of the third filler component. For example, the component A may include a third filler component content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a third filler component content of not greater than about 20.0 wt. % for a total weight of the component A, such as, not greater than about 18.0 wt. % or not greater than about 16.0 wt. % or not greater than about 14 wt. % or even not greater than about 12.0 wt. %. It will be appreciated that the third filler component content of the component A may be within a range between any of the values noted above. It will be further appreciated that the third filler component content of the component A may be any value between any of the minimum and maximum values noted above.

According to other embodiments, the component A may include a particular content of calcium carbonate. For example, the component A may include a calcium carbonate content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component A may include a calcium carbonate content of not greater than about 20.0 wt. % for a total weight of the component A, such as, not greater than about 18.0 wt. % or not greater than about 16.0 wt. % or not greater than about 14 wt. % or even not greater than about 12.0 wt. %. It will be appreciated that the calcium carbonate content of the component A may be within a range between any of the values noted above. It will be further appreciated that the calcium carbonate content of the component A may be any value between any of the minimum and maximum values noted above.

According to still other embodiments, the component A may further include a pigment component.

According to other embodiments, the component A may include a particular content of the pigment component. For example, the component A may include a pigment component content of at least about 1.0 wt. % for a total weight of the component A, such as, at least about 1.5 wt. % or at least about 2.0 wt. % or even at least about 2.5 wt. %. According to yet other embodiments, the component A may include a pigment component content of not greater than about 5.0 wt. % for a total weight of the component A, such as, not greater than about 4.5 wt. % or not greater than about 4.0 wt. % or not greater than about 3.5 wt. % or even not greater than about 3.0 wt. %. It will be appreciated that the pigment component content of the component A may be within a range between any of the values noted above. It will be further appreciated that the pigment component content of the component A may be any value between any of the minimum and maximum values noted above.

According to still other embodiments, the component A may further include a vinyl-functional pre-polymer component.

According to other embodiments, the component A may include a particular content of the vinyl-functional pre-polymer component. For example, the component A may include a vinyl-functional pre-polymer component content of at least about 10.0 wt. % for a total weight of the component A, such as, at least about 11.0 wt. % or at least about 12.0 wt. % or at least about 13.0 wt. % or at least about 14.0 wt. % or at least about 15.0 wt. % or at least about 16.0 wt. % or at least about 17.0 wt. % or at least about 18.0 wt. % or at least about 19.0 wt. % or even at least about 20.0 wt. %. According to yet other embodiments, the component A may include a vinyl-functional pre-polymer component content of not greater than about 30.0 wt. % for a total weight of the component A, such as, not greater than about 29.0 wt. % or not greater than about 28.0 wt. % or not greater than about 27.0 wt. % or even not greater than about 26.0 wt. %. It will be appreciated that the vinyl-functional pre-polymer component content of the component A may be within a range between any of the values noted above. It will be further appreciated that the vinyl-functional pre-polymer component content of the component A may be any value between any of the minimum and maximum values noted above.

According to still other embodiments, the component A may further include an alcohol-blowing agent.

According to other embodiments, the component A may include a particular content of the alcohol-blowing agent. For example, the component A may include an alcohol blowing agent content of at least about 1.0 wt. % for a total weight of the component A, such as, at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or even at least about 4.5 wt. %. According to yet other embodiments, the component A may include an alcohol blowing agent content of not greater than about 10.0 wt. % for a total weight of the component A, such as, not greater than about 9.5 wt. % or not greater than about 9.0 wt. % or not greater than about 8.5 wt. % or even not greater than about 8.0 wt. %. It will be appreciated that the alcohol blowing agent content of the component A may be within a range between any of the values noted above. It will be further appreciated that the alcohol blowing agent content of the component A may be any value between any of the minimum and maximum values noted above.

According to still other embodiments, the component A may further include a resin solution.

According to other embodiments, the component A may include a particular content of the resin solution. For example, the component A may include a resin solution content of at least about 5.0 wt. % for a total weight of the component A, such as, at least about 6.0 wt. % or at least about 7.0 wt. % or at least about 8.0 wt. % or at least about 9.0 wt. % or at least about 10.0 wt. % or at least about 11.0 wt. % or at least about 12.0 wt. % or even at least about 13.0 wt. %. According to yet other embodiments, the component A may include a resin solution content of not greater than about 25.0 wt. % for a total weight of the component A, such as, not greater than about 24.0 wt. % or not greater than about 23.0 wt. % or not greater than about 22.0 wt. % or even not greater than about 21.0 wt. %. It will be appreciated that the resin solution content of the component A may be within a range between any of the values noted above. It will be further appreciated that the resin solution content of the component A may be any value between any of the minimum and maximum values noted above.

According to still other embodiments, the component A may further include a PT catalyst component.

According to other embodiments, the component A may include a particular content of the PT catalyst component. For example, the component A may include a PT catalyst component content of at least about 0.02 wt. % for a total weight of the component A, such as, at least about 0.04 wt. % or at least about 0.06 wt. % or at least about 0.08 wt. % or even at least about 0.1 wt. %. According to yet other embodiments, the component A may include a PT catalyst component content of not greater than about 0.15 wt. % for a total weight of the component A, such as, not greater than about 0.14 wt. % or not greater than about 0.13 wt. % or not greater than about 0.12 wt. % or even not greater than about 0.11 wt. %. It will be appreciated that the PT catalyst component content of the component A may be within a range between any of the values noted above. It will be further appreciated that the PT catalyst component content of the component A may be any value between any of the minimum and maximum values noted above.

Referring to the component B of the silicone-based foam, the component B may include a silicone-based matrix component, a first filler component, a second filler component, a third filler component, and a fourth filler component.

According to particular embodiments, the silicone-based matrix component of the component B may include additional components. For example, the silicone-based matrix component may include platinum (Pt). According to still other embodiments, the silicone-based be a platinum catalyzed silicone-based matrix component. According to still other embodiments, the silicone-based matrix component of the component B may include peroxide. According to still other embodiments, the silicone-based may be a peroxide catalyzed silicone-based matrix component. According to still other embodiments, the silicone-based matrix component of the component B may include tin. According to yet other embodiments, the silicone-based matrix component of the component B may include tin catalyzed silicone-based matrix component. According to still other embodiments, the silicone-based matrix component of the component B may include tris(pentafluorophenyl) borane. According to still other embodiments, the silicone-based matrix component of the component B may include a transient basic catalyst. According to still other embodiments, the silicone-based matrix component of the component B may include phosphoronitrile chloride. According to still other embodiments, the silicone-based matrix component of the component B may include ruthenium.

According to certain embodiments, the component B may include a particular content of the silicone-based matrix component. For example, the component B may include a silicone-based matrix component content of at least about 20 wt. % for a total weight of the component B, such as, at least about 22 wt. % or at least about 25 wt. % or at least about 27 wt. % or at least about 30 wt. % or at least about 32 wt. % or even at least about 35 wt. %. According to yet other embodiments, the component B may include a silicone-based matrix component content of not greater than about 50 wt. % for a total weight of the component B, such as, not greater than about 48 wt. % or not greater than about 45 wt. % or not greater than about 43 wt. % or even not greater than about 40 wt. %. It will be appreciated that the silicone-based matrix component content of the component B may be within a range between any of the values noted above. It will be further appreciated that the silicone-based matrix component content of the component B may be any value between any of the minimum and maximum values noted above.

According to certain embodiments, the first filler component of the component B may include alumina trihydrate. According to still other embodiments, the first filler component of the component B may consist of alumina trihydrate. According to yet other embodiments, the first filler component of the component B may be an alumina trihydrate filler.

According to other embodiments, the component B may include a particular content of the first filler component. For example, the component B may include a first filler component content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component B may include a first filler component content of not greater than about 30.0 wt. % for a total weight of the component B, such as, not greater than about 25.0 wt. % or not greater than about 20.0 wt. % or not greater than about 15.0 wt. % or even not greater than about 10.0 wt. %. It will be appreciated that the first filler component content of the component B may be within a range between any of the values noted above. It will be further appreciated that the first filler component content of the component B may be any value between any of the minimum and maximum values noted above.

According to other embodiments, the component B may include a particular content of alumina trihydrate. For example, the component B may include an alumina trihydrate content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or even at least about 8.0 wt. %. According to yet other embodiments, the component B may include an alumina trihydrate content of not greater than about 30.0 wt. % for a total weight of the component B, such as, not greater than about 25.0 wt. % or not greater than about 20.0 wt. % or not greater than about 15.0 wt. % or even not greater than about 10.0 wt. %. It will be appreciated that the alumina trihydrate content of the component B may be within a range between any of the values noted above. It will be further appreciated that the alumina trihydrate content of the component B may be any value between any of the minimum and maximum values noted above.

According to still other embodiments, the second filler component of the component B may include perlite. According to still other embodiments, the second filler component of the component B may consist of perlite. According to yet other embodiments, the second filler component of the component B may be a perlite filler.

According to other embodiments, the component B may include a particular content of the second filler component. For example, the component B may include a second filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a second filler component content of not greater than about 15.0 wt. % for a total weight of the component B, such as, not greater than about 14.0 wt. % or not greater than about 13.0 wt. % or not greater than about 12.0 wt. % or even not greater than about 11.0 wt. %. It will be appreciated that the second filler component content of the component B may be within a range between any of the values noted above. It will be further appreciated that the second filler component content of the component B may be any value between any of the minimum and maximum values noted above.

According to other embodiments, the component B may include a particular content of perlite. For example, the component B may include a perlite content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a perlite content of not greater than about 15.0 wt. % for a total weight of the component B, such as, not greater than about 14.0 wt. % or not greater than about 13.0 wt. % or not greater than about 12.0 wt. % or even not greater than about 11.0 wt. %. It will be appreciated that the perlite content of the component B may be within a range between any of the values noted above. It will be further appreciated that the perlite content of the component B may be any value between any of the minimum and maximum values noted above.

According to still other embodiments, the third filler component of the component B may include calcium carbonate. According to still other embodiments, the third filler component of the component B may consist of calcium carbonate. According to yet other embodiments, the third filler component of the component B may be a calcium carbonate filler.

According to other embodiments, the component B may include a particular content of the third filler component. For example, the component B may include a third filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a third filler component content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the third filler component content of the component B may be within a range between any of the values noted above. It will be further appreciated that the third filler component content of the component B may be any value between any of the minimum and maximum values noted above.

According to other embodiments, the component B may include a particular content of calcium carbonate. For example, the component B may include a calcium carbonate content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a calcium carbonate content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the calcium carbonate content of the component B may be within a range between any of the values noted above. It will be further appreciated that the calcium carbonate content of the component B may be any value between any of the minimum and maximum values noted above.

According to still other embodiments, the fourth filler component of the component B may include zinc borate. According to still other embodiments, the fourth filler component of the component B may consist of zinc borate. According to yet other embodiments, the fourth filler component of the component B may be a zinc borate filler.

According to other embodiments, the component B may include a particular content of the fourth filler component. For example, the component B may include a fourth filler component content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a fourth filler component content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the fourth filler component content of the component B may be within a range between any of the values noted above. It will be further appreciated that the fourth filler component content of the component B may be any value between any of the minimum and maximum values noted above.

According to other embodiments, the component B may include a particular content of zinc borate. For example, the component B may include a zinc borate content of at least about 1.0 wt. % for a total weight of the component B, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the component B may include a zinc borate content of not greater than about 20.0 wt. % for a total weight of the component B, such as, not greater than about 18.0 wt. % or not greater than about 16.0 wt. % or not greater than about 14 wt. % or even not greater than about 12.0 wt. %. It will be appreciated that the zinc borate content of the component B may be within a range between any of the values noted above. It will be further appreciated that the zinc borate content of the component B may be any value between any of the minimum and maximum values noted above.

According to still other embodiments, the component B may further include a vinyl-functional pre-polymer component.

According to other embodiments, the component B may include a particular content of the vinyl-functional pre-polymer component. For example, the component B may include a vinyl-functional pre-polymer component content of at least about 10.0 wt. % for a total weight of the component B, such as, at least about 11.0 wt. % or at least about 12.0 wt. % or at least about 13.0 wt. % or at least about 14.0 wt. % or at least about 15.0 wt. % or at least about 16.0 wt. % or at least about 17.0 wt. % or at least about 18.0 wt. % or at least about 19.0 wt. % or even at least about 20.0 wt. %. According to yet other embodiments, the component B may include a vinyl-functional pre-polymer component content of not greater than about 25.0 wt. % for a total weight of the component B, such as, not greater than about 24.0 wt. % or not greater than about 23.0 wt. % or not greater than about 22.0 wt. % or even not greater than about 21.0 wt. %. It will be appreciated that the vinyl-functional pre-polymer component content of the component B may be within a range between any of the values noted above. It will be further appreciated that the vinyl-functional pre-polymer component content of the component B may be any value between any of the minimum and maximum values noted above.

According to still other embodiments, the component B may further include a hydride functional crosslinker.

According to other embodiments, the component B may include a particular content of the hydride functional crosslinker. For example, the component B may include a hydride functional crosslinker content of at least about 5.0 wt. % for a total weight of the component B, such as, at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or even at least about 9.0 wt. %. According to yet other embodiments, the component B may include a hydride functional crosslinker content of not greater than about 15.0 wt. % for a total weight of the component B, such as, not greater than about 14.5 wt. % or not greater than about 14.0 wt. % or not greater than about 13.5 wt. % or even not greater than about 13.0 wt. %. It will be appreciated that the hydride functional crosslinker content of the component B may be within a range between any of the values noted above. It will be further appreciated that the hydride functional crosslinker content of the component B may be any value between any of the minimum and maximum values noted above.

According to still other embodiments, the component B may further include an Inhibitor component.

According to other embodiments, the component B may include a particular content of the inhibitor component. For example, the component B may include an inhibitor component content of at least about 0.02 wt. % for a total weight of the component B, such as, at least about 0.04 wt. % or at least about 0.06 wt. % or at least about 0.08 wt. % or even at least about 0.1 wt. %. According to yet other embodiments, the component B may include an inhibitor component content of not greater than about 0.15 wt. % for a total weight of the component B, such as, not greater than about 0.14 wt. % or not greater than about 0.13 wt. % or not greater than about 0.12 wt. % or even not greater than about 0.11 wt. %. It will be appreciated that the inhibitor component content of the component B may be within a range between any of the values noted above. It will be further appreciated that the inhibitor component content of the component B may be any value between any of the minimum and maximum values noted above.

Referring now to other embodiments of the silicone-based foam formed according to forming method 100, the silicone-based foam may be described as including a silicone based matrix component, a first filler component, a second filler component, a third filler component, and a fourth filler component.

According to particular embodiments, the silicone-based matrix component of the silicone-based foam may include additional components. For example, the silicone-based matrix component may include platinum (Pt). According to still other embodiments, the silicone-based be a platinum catalyzed silicone-based matrix component. According to still other embodiments, the silicone-based matrix component of the silicone-based foam may include peroxide. According to still other embodiments, the silicone-based may be a peroxide catalyzed silicone-based matrix component. According to still other embodiments, the silicone-based matrix component of the silicone-based foam may include tin. According to yet other embodiments, the silicone-based matrix component of the silicone-based foam may include tin catalyzed silicone-based matrix component. According to still other embodiments, the silicone-based matrix component of the silicone-based foam may include tris(pentafluorophenyl) borane. According to still other embodiments, the silicone-based matrix component of the silicone-based foam may include a transient basic catalyst. According to still other embodiments, the silicone-based matrix component of the silicone-based foam may include phosphoronitrile chloride. According to still other embodiments, the silicone-based matrix component of the silicone-based foam may include ruthenium.

According to certain embodiments, the silicone-based foam may include a particular content of the silicone-based matrix component. For example, the silicone-based foam may include a silicone-based matrix component content of at least about 25.0 wt. % for a total weight of the silicone-based foam, such as, at least about 27.0 wt. % or at least about 30.0 wt. % or at least about 32.0 wt. % or at least about 35.0 wt. % or at least about 37.0 wt. % or even at least about 40.0 wt. %. According to yet other embodiments, the silicone-based foam may include a silicone-based matrix component content of not greater than about 55.0 wt. % for a total weight of the silicone-based foam, such as, not greater than about 53.0 wt. % or not greater than about 50.0 wt. % or not greater than about 48.0 wt. % or even not greater than about 45.0 wt. %. It will be appreciated that the silicone-based matrix component content of the silicone-based foam may be within a range between any of the values noted above. It will be further appreciated that the silicone-based matrix component content of the silicone-based foam may be any value between any of the minimum and maximum values noted above.

According to yet other embodiments, the first filler component of the silicone-based foam may include alumina trihydrate. According to still other embodiments, the first filler component of the silicone-based foam may consist of alumina trihydrate. According to yet other embodiments, the first filler component of the silicone-based foam may be an alumina trihydrate filler.

According to other embodiments, the silicone-based foam may include a particular content of the first filler component. For example, the silicone-based foam may include a first filler component content of at least about 5.0 wt. % for a total weight of the silicone-based foam, such as, at least about 6.0 wt. % or at least about 7.0 wt. % or at least about 8.0 wt. % or at least about 9.0 wt. % or at least about 10.0 wt. % or even at least about 11.0 wt. %. According to yet other embodiments, the silicone-based foam may include a first filler component content of not greater than about 30.0 wt. % for a total weight of the silicone-based foam, such as, not greater than about 28.0 wt. % or not greater than about 26.0 wt. % or not greater than about 24.0 wt. % or even not greater than about 22.0 wt. %. It will be appreciated that the first filler component content of the silicone-based foam may be within a range between any of the values noted above. It will be further appreciated that the first filler component content of the silicone-based foam may be any value between any of the minimum and maximum values noted above.

According to other embodiments, the silicone-based foam may include a particular content of alumina trihydrate. For example, the silicone-based foam may include an alumina trihydrate content of at least about 5.0 wt. % for a total weight of the silicone-based foam, such as, at least about 6.0 wt. % or at least about 7.0 wt. % or at least about 8.0 wt. % or at least about 9.0 wt. % or at least about 10.0 wt. % or even at least about 11.0 wt. %. According to yet other embodiments, the silicone-based foam may include an alumina trihydrate content of not greater than about 30.0 wt. % for a total weight of the silicone-based foam, such as, not greater than about 28.0 wt. % or not greater than about 26.0 wt. % or not greater than about 24.0 wt. % or even not greater than about 22.0 wt. %. It will be appreciated that the alumina trihydrate content of the silicone-based foam may be within a range between any of the values noted above. It will be further appreciated that the alumina trihydrate content of the silicone-based foam may be any value between any of the minimum and maximum values noted above.

According to still other embodiments, the second filler component of the silicone-based foam may include perlite. According to still other embodiments, the second filler component of the silicone-based foam may consist of perlite. According to yet other embodiments, the second filler component of the silicone-based foam may be a perlite filler.

According to other embodiments, the silicone-based foam may include a particular content of the second filler component. For example, the silicone-based foam may include a second filler component content of at least about 1.0 wt. % for a total weight of the silicone-based foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the silicone-based foam may include a second filler component content of not greater than about 15.0 wt. % for a total weight of the silicone-based foam, such as, not greater than about 14 wt. % or not greater than about 13.0 wt. % or not greater than about 12.0 wt. % or even not greater than about 110 wt. %. It will be appreciated that the second filler component content of the silicone-based foam may be within a range between any of the values noted above. It will be further appreciated that the second filler component content of the silicone-based foam may be any value between any of the minimum and maximum values noted above.

According to other embodiments, the silicone-based foam may include a particular content of perlite. For example, the silicone-based foam may include a perlite content of at least about 1.0 wt. % for a total weight of the silicone-based foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the silicone-based foam may include a perlite content of not greater than about 15.0 wt. % for a total weight of the silicone-based foam, such as, not greater than about 14 wt. % or not greater than about 13.0 wt. % or not greater than about 12.0 wt. % or even not greater than about 110 wt. %. It will be appreciated that the perlite content of the silicone-based foam may be within a range between any of the values noted above. It will be further appreciated that the perlite content of the silicone-based foam may be any value between any of the minimum and maximum values noted above.

According to still other embodiments, the third filler component of the silicone-based foam may include calcium carbonate. According to still other embodiments, the third filler component of the silicone-based foam may consist of calcium carbonate. According to yet other embodiments, the third filler component of the silicone-based foam may be a calcium carbonate filler.

According to other embodiments, the silicone-based foam may include a particular content of the third filler component. For example, the silicone-based foam may include a third filler component content of at least about 1.0 wt. % for a total weight of the silicone-based foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the silicone-based foam may include a third filler component content of not greater than about 20.0 wt. % for a total weight of the silicone-based foam, such as, not greater than about 18 wt. % or not greater than about 16.0 wt. % or not greater than about 15.0 wt. % or even not greater than about 14.0 wt. %. It will be appreciated that the third filler component content of the silicone-based foam may be within a range between any of the values noted above. It will be further appreciated that the third filler component content of the silicone-based foam may be any value between any of the minimum and maximum values noted above.

According to other embodiments, the silicone-based foam may include a particular content of calcium carbonate. For example, the silicone-based foam may include a calcium carbonate content of at least about 1.0 wt. % for a total weight of the silicone-based foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the silicone-based foam may include a calcium carbonate content of not greater than about 20.0 wt. % for a total weight of the silicone-based foam, such as, not greater than about 18 wt. % or not greater than about 16.0 wt. % or not greater than about 15.0 wt. % or even not greater than about 14.0 wt. %. It will be appreciated that the calcium carbonate content of the silicone-based foam may be within a range between any of the values noted above. It will be further appreciated that the calcium carbonate content of the silicone-based foam may be any value between any of the minimum and maximum values noted above.

According to still other embodiments, the fourth filler component of the silicone-based foam may include zinc borate. According to still other embodiments, the fourth filler component of the silicone-based foam may consist of zinc borate. According to yet other embodiments, the fourth filler component of the silicone-based foam may be a zinc borate filler.

According to other embodiments, the silicone-based foam may include a particular content of the fourth filler component. For example, the silicone-based foam may include a fourth filler component content of at least about 1.0 wt. % for a total weight of the silicone-based foam, such as, at least about 1.5 wt. % or at least about 2.0 wt. % or even at least about 2.5 wt. %. According to yet other embodiments, the silicone-based foam may include a fourth filler component content of not greater than about 10.0 wt. % for a total weight of the silicone-based foam, such as, not greater than about 9.0 wt. % or not greater than about 8.0 wt. % or not greater than about 7.0 wt. % or even not greater than about 6.0 wt. %. It will be appreciated that the fourth filler component content of the silicone-based foam may be within a range between any of the values noted above. It will be further appreciated that the fourth filler component content of the silicone-based foam may be any value between any of the minimum and maximum values noted above.

According to other embodiments, the silicone-based foam may include a particular content of zinc borate. For example, the silicone-based foam may include a zinc borate content of at least about 1.0 wt. % for a total weight of the silicone-based foam, such as, at least about 1.5 wt. % or at least about 2.0 wt. % or even at least about 2.5 wt. %. According to yet other embodiments, the silicone-based foam may include a zinc borate content of not greater than about 10.0 wt. % for a total weight of the silicone-based foam, such as, not greater than about 9.0 wt. % or not greater than about 8.0 wt. % or not greater than about 7.0 wt. % or even not greater than about 6.0 wt. %. It will be appreciated that the zinc borate content of the silicone-based foam may be within a range between any of the values noted above. It will be further appreciated that the zinc borate content of the silicone-based foam may be any value between any of the minimum and maximum values noted above.

According to still other embodiments, the silicone-based foam may further include a pigment component.

According to other embodiments, the silicone-based foam may include a particular content of the pigment component. For example, the silicone-based foam may include a pigment component content of at least about 0.5 wt. % for a total weight of the silicone-based foam, such as, at least about 0.7 wt. % or at least about 1.0 wt. % or even at least about 1.2 wt. %. According to yet other embodiments, the silicone-based foam may include a pigment component content of not greater than about 2.5 wt. % for a total weight of the silicone-based foam, such as, not greater than about 2.3 wt. % or not greater than about 2.0 wt. % or not greater than about 1.8 wt. % or even not greater than about 1.5 wt. %. It will be appreciated that the pigment component content of the silicone-based foam may be within a range between any of the values noted above. It will be further appreciated that the pigment component content of the silicone-based foam may be any value between any of the minimum and maximum values noted above.

According to still other embodiments, the silicone-based foam may further include a vinyl-functional pre-polymer component.

According to other embodiments, the silicone-based foam may include a particular content of the vinyl-functional pre-polymer component. For example, the silicone-based foam may include a vinyl-functional pre-polymer component content of at least about 10.0 wt. % for a total weight of the silicone-based foam, such as, at least about 11.0 wt. % or at least about 12.0 wt. % or at least about 13.0 wt. % or at least about 14.0 wt. % or at least about 15.0 wt. % or at least about 16.0 wt. % or at least about 17.0 wt. % or at least about 18.0 wt. % or at least about 19.0 wt. % or even at least about 20.0 wt. %. According to yet other embodiments, the silicone-based foam may include a vinyl-functional pre-polymer component content of not greater than about 30.0 wt. % for a total weight of the silicone-based foam, such as, not greater than about 29.0 wt. % or not greater than about 28.0 wt. % or not greater than about 27.0 wt. % or even not greater than about 26.0 wt. %. It will be appreciated that the vinyl-functional pre-polymer component content of the silicone-based foam may be within a range between any of the values noted above. It will be further appreciated that the vinyl-functional pre-polymer component content of the silicone-based foam may be any value between any of the minimum and maximum values noted above.

According to still other embodiments, the silicone-based foam may further include an alcohol-blowing agent.

According to other embodiments, the silicone-based foam may include a particular content of the alcohol-blowing agent. For example, the silicone-based foam may include an alcohol blowing agent content of at least about 0.5 wt. % for a total weight of the silicone-based foam, such as, at least about 0.7 wt. % or at least about 1.0 wt. % or at least about 1.2 wt. % or at least about 1.5 wt. % or at least about 1.7 wt. % or at least about 2.0 wt. % or at least about 2.2 wt. % or even at least about 2.5 wt. %. According to yet other embodiments, the silicone-based foam may include an alcohol blowing agent content of not greater than about 5.0 wt. % for a total weight of the silicone-based foam, such as, not greater than about 4.8 wt. % or not greater than about 4.5 wt. % or not greater than about 4.3 wt. % or even not greater than about 4.0 wt. %. It will be appreciated that the alcohol blowing agent content of the silicone-based foam may be within a range between any of the values noted above. It will be further appreciated that the alcohol blowing agent content of the silicone-based foam may be any value between any of the minimum and maximum values noted above.

According to still other embodiments, the silicone-based foam may further include a resin solution.

According to other embodiments, the silicone-based foam may include a particular content of the resin solution. For example, the silicone-based foam may include a resin solution content of at least about 2.5 wt. % for a total weight of the silicone-based foam, such as, at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or even at least about 4.5 wt. %. According to yet other embodiments, the silicone-based foam may include a resin solution content of not greater than about 13.0 wt. % for a total weight of the silicone-based foam, such as, not greater than about 12.0 wt. % or not greater than about 11.0 wt. % or not greater than about 10.0 wt. % or even not greater than about 9.0 wt. %. It will be appreciated that the resin solution content of the silicone-based foam may be within a range between any of the values noted above. It will be further appreciated that the resin solution content of the silicone-based foam may be any value between any of the minimum and maximum values noted above.

According to still other embodiments, the silicone-based foam may further include a PT catalyst component.

According to other embodiments, the silicone-based foam may include a particular content of the PT catalyst component. For example, the silicone-based foam may include a PT catalyst component content of at least about 0.02 wt. % for a total weight of the silicone-based foam, such as, at least about 0.04 wt. % or at least about 0.06 wt. % or at least about 0.08 wt. % or even at least about 0.1 wt. %. According to yet other embodiments, the silicone-based foam may include a PT catalyst component content of not greater than about 0.15 wt. % for a total weight of the silicone-based foam, such as, not greater than about 0.14 wt. % or not greater than about 0.13 wt. % or not greater than about 0.12 wt. % or even not greater than about 0.11 wt. %. It will be appreciated that the PT catalyst component content of the silicone-based foam may be within a range between any of the values noted above. It will be further appreciated that the PT catalyst component content of the silicone-based foam may be any value between any of the minimum and maximum values noted above.

According to still other embodiments, the silicone-based foam may further include a hydride functional crosslinker.

According to other embodiments, the silicone-based foam may include a particular content of the hydride functional crosslinker. For example, the silicone-based foam may include a hydride functional crosslinker content of at least about 5.0 wt. % for a total weight of the silicone-based foam, such as, at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or even at least about 9.0 wt. %. According to yet other embodiments, the silicone-based foam may include a hydride functional crosslinker content of not greater than about 15.0 wt. % for a total weight of the silicone-based foam, such as, not greater than about 14.5 wt. % or not greater than about 14.0 wt. % or not greater than about 13.5 wt. % or even not greater than about 13.0 wt. %. It will be appreciated that the hydride functional crosslinker content of the silicone-based foam may be within a range between any of the values noted above. It will be further appreciated that the hydride functional crosslinker content of the silicone-based foam may be any value between any of the minimum and maximum values noted above.

According to still other embodiments, the silicone-based foam may further include an Inhibitor component.

According to other embodiments, the silicone-based foam may include a particular content of the inhibitor component. For example, the silicone-based foam may include an inhibitor component content of at least about 0.02 wt. % for a total weight of the silicone-based foam, such as, at least about 0.04 wt. % or at least about 0.06 wt. % or at least about 0.08 wt. % or even at least about 0.1 wt. %. According to yet other embodiments, the silicone-based foam may include an inhibitor component content of not greater than about 0.5 wt. % for a total weight of the silicone-based foam, such as, not greater than about 0.4 wt. % or not greater than about 0.3 wt. % or not greater than about 0.2 wt. % or even not greater than about 0.1 wt. %. It will be appreciated that the inhibitor component content of the silicone-based foam may be within a range between any of the values noted above. It will be further appreciated that the inhibitor component content of the silicone-based foam may be any value between any of the minimum and maximum values noted above.

According to certain embodiments, the silicone-based foam may have a particular flammability rating as measured according to ASTM D4986. In particular, the foam layer may have a HBF flammability rating as measured according to ASTM D4986.

According to certain embodiments, the silicone-based foam may have a particular flammability rating as measured according to ASTM D3801. In particular, the foam layer may have a V-0 flammability rating as measured according to ASTM D3801.

According to yet other embodiments, the silicone-based foam may have a particular self-ignition time when exposed to a hot plate test at a temperature of 650° C. For purposes of embodiments described herein, the hot plate test is carried out by preparing a 1-inch by 1-inch specimen of the material, which is put on top of a hot plate. Then a thermal couple is fixed in a steel weight (1 inch in diameter, 2 inches in height) is put on top of the specimen to measure the cold side surface temperature. The temperature curve is recorded and the point, if any, of self-ignition is recorded. According to particular embodiments, the silicone-based foam may have a self ignition time of at least about 1 minute, such as, at least about 1.5 minutes or at least about 2 minutes or at least about 2.5 minutes or at least about 3 minutes or at least about 3.5 minutes or at least about 4.0 minutes or at least about 4.5 minutes or even at least about 5.0 minutes. It will be appreciated that the self ignition time of the silicone-based foam may be within a range between any of the values noted above. It will be further appreciated that the self-ignition time of the silicone-based foam may be any value between any of the values noted above.

According to still other embodiments, the silicone-based foam may have a particular cold-side temperature as measured at 5 minutes when a 3 mm thickness of the foam is exposed to a hot plate test at 650° C. For purposes of embodiments described herein, the hot plate test is carried out by preparing a 1 inch by 1 inch specimen of the material, which is put on top of a hot plate. Then a thermal couple is fixed in a steel weight (1 inch in diameter, 2 inches in height) is put on top of the specimen to measure the cold side surface temperature. According to certain embodiments, the silicone-based foam may have a cold side temperature of not greater than about 300° C., such as, not greater than about 275° C. or not greater than about 250° C. or not greater than about 225° C. or not greater than about 200° C. or not greater than about 175° C. or even not greater than about 150° C. According to still other embodiments, the silicone-based foam may have a cold side temperature of at least about 25° C. It will be appreciated that the cold side temperature of the silicone-based foam may be within a range between any of the values noted above. It will be further appreciated that the cold side temperature of the silicone-based foam may be any value between any of the values noted above.

According to yet other embodiments, the silicone-based foam may have a particular thickness. For example, the silicone-based foam may have a thickness of at least about 0.5 mm, such as, at least about 1.0 mm or at least about 1.5 mm or at least about 2.0 mm or at least about 2.5 mm or at least about 3.0 mm or at least about 3.5 mm or at least about 4.0 mm or at least about 4.5 mm or even at least about 5.0 mm. According to still other embodiments, the silicone-based foam may have a thickness of not greater than about 10 mm, such as, not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or even not greater than about 6.0 mm. It will be appreciated that the thickness of the silicone-based foam may be within a range between any of the minimum and maximum values noted above. It will be further appreciated that the thickness of the silicone-based foam may be any value between any of the minimum and maximum values noted above.

According to certain embodiments, the foam layer described herein may be formed according to any acceptable forming process for a foam material or foam layer.

Tuning to additional embodiments described herein, such embodiments are generally directed to a battery. According to particular embodiments, the battery may include a silicone-based foam formed according to embodiments described herein. It will be appreciated that silicone-based foam may have any of the characteristics or properties described herein.

Tuning to still additional embodiments described herein, such embodiments are generally directed to a compression/tolerance pad for a battery. According to particular embodiments, the compression/tolerance pad for a battery may include a silicone-based foam formed according to embodiments described herein. It will be appreciated that silicone-based foam may have any of the characteristics or properties described herein.

Tuning to yet other embodiments described herein, such embodiments are generally directed to a thermal runaway protection pad for a battery. According to particular embodiments, the thermal runaway protection pad for a battery may include a silicone-based foam formed according to embodiments described herein. It will be appreciated that silicone-based foam may have any of the characteristics or properties described herein.

Tuning now to other embodiments described herein, such embodiments are generally directed to a packing seal for a battery. According to particular embodiments, the packing seal for a battery may include a silicone-based foam formed according to embodiments described herein. It will be appreciated that silicone-based foam may have any of the characteristics or properties described herein.

Tuning to still additional embodiments described herein, such embodiments are generally directed to a fire blocking foam for a battery. According to particular embodiments, the fire blocking foam for a battery may include a silicone-based foam formed according to embodiments described herein. It will be appreciated that silicone-based foam may have any of the characteristics or properties described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A silicone-based foam comprising a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 2. A silicone-based foam comprising: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

Embodiment 3. A silicone-based foam formed from a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 4. The foam layer of embodiment 2, wherein the silicone-based foam comprises a component A and a component B.

Embodiment 5. The silicone-based foam of any one of embodiments 1, 3, and 4, wherein the component A comprises a silicone-based matrix component content of at least about 30 wt. % for a total weight of the component A.

Embodiment 6. The silicone-based foam of any one of embodiments 1, 3, and 4, wherein the component A comprises a silicone-based matrix component content of not greater than about 60 wt. % for a total weight of the component A.

Embodiment 7. The silicone-based foam of embodiment 4, wherein the component A comprises a first filler component comprising alumina trihydrate at a content of at least about 5 wt. % for a total weight of the component A.

Embodiment 8. The silicone-based foam of embodiment 4, wherein the component A comprises a first filler component comprising alumina trihydrate at a content of not greater than about 30 wt. % for a total weight of the component A.

Embodiment 9. The silicone-based foam of embodiment 4, wherein the component A comprises a second filler component comprising perlite at a content of at least about 1 wt. % for a total weight of the component A.

Embodiment 10. The silicone-based foam of embodiment 4, wherein the component A comprises a second filler component comprising perlite at a content of not greater than about 15 wt. % for a total weight of the component A.

Embodiment 11. The silicone-based foam of embodiment 4, wherein the component A comprises a third filler component comprising calcium carbonate at a content of at least about 1 wt. % for a total weight of the component A.

Embodiment 12. The silicone-based foam of embodiment 4, wherein the component A comprises a third filler component comprising calcium carbonate at a content of not greater than about 20 wt. % for a total weight of the component A.

Embodiment 13. The silicone-based foam of any one of embodiments 1, 3, and 4, wherein the component A comprises a pigment component at a content of at least about 1 wt. % for a total weight of the component A.

Embodiment 14. The silicone-based foam of any one of embodiments 1, 3, and 4, wherein the component A comprises a pigment component at a content of not greater than about 5 wt. % for a total weight of the component A.

Embodiment 15. The silicone-based foam of any one of embodiments 1, 3, and 4, wherein the component A comprises a vinyl-functional pre-polymer component at a content of at least about 10 wt. % for a total weight of the component A.

Embodiment 16. The silicone-based foam of any one of embodiments 1, 3, and 4, wherein the component A comprises a vinyl-functional pre-polymer component at a content of not greater than about 30 wt. % for a total weight of the component A.

Embodiment 17. The silicone-based foam of any one of embodiments 1, 3, and 4, wherein the component A comprises an alcohol blowing agent at a content of at least about 1 wt. % for a total weight of the component A.

Embodiment 18. The silicone-based foam of any one of embodiments 1, 3, and 4, wherein the component A comprises an alcohol blowing agent at a content of not greater than about 10 wt. % for a total weight of the component A.

Embodiment 19. The silicone-based foam of any one of embodiments 1, 3, and 4, wherein the component A comprises a resin solution at a content of at least about 5 wt. % for a total weight of the component A.

Embodiment 20. The silicone-based foam of any one of embodiments 1, 3, and 4, wherein the component A comprises a resin solution at a content of not greater than about 25 wt. % for a total weight of the component A.

Embodiment 21. The silicone-based foam of any one of embodiments 1, 3, and 4, wherein the component A comprises a Pt catalyst component at a content of at least about 0.02 wt. % for a total weight of the component A.

Embodiment 22. The silicone-based foam of any one of embodiments 1, 3, and 4, wherein the component A comprises a Pt catalyst component at a content of not greater than about 0.15 wt. % for a total weight of the component A.

Embodiment 23. The silicone-based foam of any one of embodiments 1 and 2, wherein the component B comprises a silicone-based matrix component content of at least about 20 wt. % for a total weight of the component B.

Embodiment 24. The silicone-based foam of any one of embodiments 1 and 2, wherein the component B comprises a silicone-based matrix component content of not greater than about 50 wt. % for a total weight of the component B.

Embodiment 25. The silicone-based foam of embodiment 4, wherein the component B comprises a first filler component comprising alumina trihydrate at a content of at least about 5 wt. % for a total weight of the component B.

Embodiment 26. The silicone-based foam of embodiment 4, wherein the component B comprises a first filler component comprising alumina trihydrate at a content of not greater than about 30 wt. % for a total weight of the component B.

Embodiment 27. The silicone-based foam of embodiment 4, wherein the component B comprises a second filler component comprising perlite at a content of at least about 1 wt. % for a total weight of the component B.

Embodiment 28. The silicone-based foam of embodiment 4, wherein the component B comprises a second filler component comprising perlite at a content of not greater than about 15 wt. % for a total weight of the component B.

Embodiment 29. The silicone-based foam of embodiment 4, wherein the component B comprises a third filler component comprising calcium carbonate at a content of at least about 1 wt. % for a total weight of the component B.

Embodiment 30. The silicone-based foam of embodiment 4, wherein the component B comprises a third filler component comprising calcium carbonate at a content of not greater than about 20 wt. % for a total weight of the component B.

Embodiment 31. The silicone-based foam of embodiment 4, wherein the component B comprises a fourth filler component comprising zinc borate at a content of at least about 1 wt. % for a total weight of the component B.

Embodiment 32. The silicone-based foam of embodiment 4, wherein the component B comprises a fourth filler component comprising zinc borate at a content of not greater than about 20 wt. % for a total weight of the component B.

Embodiment 33. The silicone-based foam of any one of embodiments 1, 3, and 4, wherein the component B comprises a vinyl-functional pre-polymer component at a content of at least about 10 wt. % for a total weight of the component B.

Embodiment 34. The silicone-based foam of any one of embodiments 1, 3, and 4, wherein the component B comprises a vinyl-functional pre-polymer component at a content of not greater than about 25 wt. % for a total weight of the component B.

Embodiment 35. The silicone-based foam of any one of embodiments 1, 3, and 4, wherein the component B comprises a hydride functional crosslinker component at a content of at least about 5 wt. % for a total weight of the component B.

Embodiment 36. The silicone-based foam of any one of embodiments 1, 3, and 4, wherein the component B comprises a hydride functional crosslinker component at a content of not greater than about 15 wt. % for a total weight of the component B.

Embodiment 37. The silicone-based foam of any one of embodiments 1, 3, and 4, wherein the component B comprises an inhibitor component at a content of at least about 0.05 wt. % for a total weight of the component B.

Embodiment 38. The silicone-based foam of any one of embodiments 1, 3, and 4, wherein the component B comprises an inhibitor component at a content of not greater than about 0.5 wt. % for a total weight of the component B.

Embodiment 39. The silicone-based foam of any one of embodiments 1 and 3, wherein the silicone-based foam comprises a silicone-based matrix component content of at least about 25 wt. % for a total weight of the silicone-based foam.

Embodiment 40. The silicone-based foam of any one of embodiments 1 and 3, wherein the silicone-based foam comprises a silicone-based matrix component content of not greater than about 55 wt. % for a total weight of the silicone-based foam.

Embodiment 41. The silicone-based foam of embodiment 4, wherein the silicone-based foam comprises a first filler component comprising alumina trihydrate at a content of at least about 5 wt. % for a total weight of the silicone-based foam.

Embodiment 42. The silicone-based foam of embodiment 4, wherein the silicone-based foam comprises a first filler component comprising alumina trihydrate at a content of not greater than about 30 wt. % for a total weight of the silicone-based foam.

Embodiment 43. The silicone-based foam of embodiment 4, wherein the silicone-based foam comprises a second filler component comprising perlite at a content of at least about 1 wt. % for a total weight of the silicone-based foam.

Embodiment 44. The silicone-based foam of embodiment 4, wherein the silicone-based foam comprises a second filler component comprising perlite at a content of not greater than about 15 wt. % for a total weight of the silicone-based foam.

Embodiment 45. The silicone-based foam of embodiment 4, wherein the silicone-based foam comprises a third filler component comprising calcium carbonate at a content of at least about 1 wt. % for a total weight of the silicone-based foam.

Embodiment 46. The silicone-based foam of embodiment 4, wherein the silicone-based foam comprises a third filler component comprising calcium carbonate at a content of not greater than about 20 wt. % for a total weight of the silicone-based foam.

Embodiment 47. The silicone-based foam of embodiment 4, wherein the silicone-based foam comprises a fourth filler component comprising zinc borate at a content of at least about 1 wt. % for a total weight of the silicone-based foam.

Embodiment 48. The silicone-based foam of embodiment 4, wherein the silicone-based foam comprises a fourth filler component comprising zinc borate at a content of not greater than about 10 wt. % for a total weight of the silicone-based foam.

Embodiment 49. The silicone-based foam of any one of embodiments 1, 2, and 3, wherein the silicone-based foam comprises a pigment component at a content of at least about 0.5 wt. % for a total weight of the silicone-based foam.

Embodiment 50. The silicone-based foam of any one of embodiments 1, 2, and 3, wherein the silicone-based foam comprises a pigment component at a content of not greater than about 2.5 wt. % for a total weight of the silicone-based foam.

Embodiment 51. The silicone-based foam of any one of embodiments 1, 2, and 3, wherein the silicone-based foam comprises a vinyl-functional pre-polymer component at a content of at least about 10 wt. % for a total weight of the silicone-based foam.

Embodiment 52. The silicone-based foam of any one of embodiments 1, 2, and 3, wherein the silicone-based foam comprises a vinyl-functional pre-polymer component at a content of not greater than about 28 wt. % for a total weight of the silicone-based foam.

Embodiment 53. The silicone-based foam of any one of embodiments 1, 2, and 3, wherein the silicone-based foam comprises an alcohol blowing agent at a content of at least about 0.5 wt. % for a total weight of the silicone-based foam.

Embodiment 54. The silicone-based foam of any one of embodiments 1, 2, and 3, wherein the silicone-based foam comprises an alcohol blowing agent at a content of not greater than about 5 wt. % for a total weight of the silicone-based foam.

Embodiment 55. The silicone-based foam of any one of embodiments 1, 2, and 3, wherein the silicone-based foam comprises a resin solution at a content of at least about 2.5 wt. % for a total weight of the silicone-based foam.

Embodiment 56. The silicone-based foam of any one of embodiments 1, 2, and 3, wherein the silicone-based foam comprises a resin solution at a content of not greater than about 13 wt. % for a total weight of the silicone-based foam.

Embodiment 57. The silicone-based foam of any one of embodiments 1, 2, and 3, wherein the silicone-based foam comprises a Pt catalyst component at a content of at least about 0.02 wt. % for a total weight of the silicone-based foam.

Embodiment 58. The silicone-based foam of any one of embodiments 1, 2, and 3, wherein the silicone-based foam comprises a Pt catalyst component at a content of not greater than about 0.15 wt. % for a total weight of the silicone-based foam.

Embodiment 59. The silicone-based foam of any one of embodiments 1, 3, and 4, wherein the silicone-based foam comprises a hydride functional crosslinker component at a content of at least about 5 wt. % for a total weight of the silicone-based foam.

Embodiment 60. The silicone-based foam of any one of embodiments 1, 3, and 4, wherein the silicone-based foam comprises a hydride functional crosslinker component at a content of not greater than about 15 wt. % for a total weight of the silicone-based foam.

Embodiment 61. The silicone-based foam of any one of embodiments 1, 3, and 4, wherein the silicone-based foam comprises an inhibitor component at a content of at least about 0.05 wt. % for a total weight of the silicone-based foam.

Embodiment 62. The silicone-based foam of any one of embodiments 1, 3, and 4, wherein the silicone-based foam comprises an inhibitor component at a content of not greater than about 0.5 wt. % for a total weight of the silicone-based foam.

Embodiment 63. The silicone-based foam of any one of embodiments 1, 2, and 3, wherein the silicone-based matrix component comprises additional cured silicone foam, peroxide cured silicone foam, tin catalyzed silicone foam.

Embodiment 64. The silicone-based foam of any one of embodiments 1, 2, and 3, wherein the silicone-based foam comprises a thickness of at least about 0.5 mm.

Embodiment 65. The silicone-based foam of any one of embodiments 1, 2, and 3, wherein the silicone-based foam comprises a thickness of not greater than about 10 mm.

Embodiment 66. A battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 67. A battery comprising a silicone-based foam, wherein the silicone-based foam comprises: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

Embodiment 68. A battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 69. A compression/tolerance pad for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 70. A compression/tolerance pad for a battery comprising a silicone-based foam, wherein the silicone-based foam comprises: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

Embodiment 71. A compression/tolerance pad for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 72. A thermal runaway protection pad for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 73. A thermal runaway protection pad for a battery comprising a silicone-based foam, wherein the silicone-based foam comprises: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

Embodiment 74. A thermal runaway protection pad for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 75. A packing seal for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 76. A packing seal for a battery comprising a silicone-based foam, wherein the silicone-based foam comprises: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

Embodiment 77. A packing seal for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 78. A fire blocking foam for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Embodiment 79. A fire blocking foam for a battery comprising a silicone-based foam, wherein the silicone-based foam comprises: a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 5 wt. % for a total weight of the silicone-based foam, wherein the silicone-based foam comprises a V-0 flammability rating as measured according to ASTM D3801.

Embodiment 80. A fire blocking foam for a battery comprising a silicone-based foam, wherein the silicone-based foam comprises a component A and a component B, wherein the component A comprises: a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises: a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

Note that not all of the activities described above in the general description, or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A silicone-based foam comprising a component A and a component B, wherein the component A comprises:

a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises:

a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

2. The silicone-based foam of claim 1, wherein the component A comprises a pigment component at a content of at least about 1 wt. % for a total weight of the component A.

3. The silicone-based foam of claim 1, wherein the component A comprises a pigment component at a content of not greater than about 5 wt. % for a total weight of the component A.

4. The silicone-based foam of claim 1, wherein the component A comprises a vinyl-functional pre-polymer component at a content of at least about 10 wt. % for a total weight of the component A.

5. The silicone-based foam of claim 1, wherein the component A comprises a vinyl-functional pre-polymer component at a content of not greater than about 30 wt. % for a total weight of the component A.

6. The silicone-based foam of claim 1, wherein the component A comprises an alcohol blowing agent at a content of at least about 1 wt. % for a total weight of the component A.

7. The silicone-based foam of claim 1, wherein the component A comprises an alcohol blowing agent at a content of not greater than about 10 wt. % for a total weight of the component A.

8. The silicone-based foam of claim 1, wherein the component A comprises a resin solution at a content of at least about 5 wt. % for a total weight of the component A.

9. The silicone-based foam of claim 1, wherein the component A comprises a resin solution at a content of not greater than about 25 wt. % for a total weight of the component A.

10. The silicone-based foam of claim 1, wherein the component A comprises a Pt catalyst component at a content of at least about 0.02 wt. % for a total weight of the component A.

11. The silicone-based foam of claim 1, wherein the component A comprises a Pt catalyst component at a content of not greater than about 0.15 wt. % for a total weight of the component A.

12. A silicone-based foam formed from a component A and a component B, wherein the component A comprises:

a silicone-based matrix component, a first filler component comprising alumina trihydrate at a content of at least about 5 wt. % and not greater than about 30 wt. % for a total weight of the component A, a second filler component comprising perlite at a content of at least about 1 wt. % and not greater than about 15 wt. % for a total weight of the component A, and a third filler component comprising calcium carbonate at a content of at least about 1 wt. % and not greater than about 20 wt. % for a total weight of the component A, wherein the component B comprises:

a silicone-based matrix component, a first filler component comprising alumina trihydrate at a content of at least about 5 wt. % and not greater than about 30 wt. % for a total weight of the component B, a second filler component comprising perlite at a content of at least about 1 wt. % and not greater than about 15 wt. % for a total weight of the component B, a third filler component comprising calcium carbonate at a content of at least about 1 wt. % and not greater than about 20 wt. % for a total weight of the component B, and a fourth filler component comprising zinc borate at a content of at least about 1 wt. % and not greater than about 20 wt. % for a total weight of the component B, and wherein the silicone-based foam comprises a V-0 flammability rating as measured according to ASTM D3801.

13. The silicone-based foam of claim 12, wherein the component A comprises a pigment component at a content of at least about 1 wt. % for a total weight of the component A.

14. The silicone-based foam of claim 12, wherein the component A comprises a pigment component at a content of not greater than about 5 wt. % for a total weight of the component A.

15. The silicone-based foam of claim 12, wherein the component A comprises a vinyl-functional pre-polymer component at a content of at least about 10 wt. % for a total weight of the component A.

16. The silicone-based foam of claim 12, wherein the component A comprises a vinyl-functional pre-polymer component at a content of not greater than about 30 wt. % for a total weight of the component A.

17. The silicone-based foam of claim 12, wherein the component A comprises an alcohol blowing agent at a content of at least about 1 wt. % and not greater than about 10 wt. % for a total weight of the component A.

18. A silicone-based foam comprising:

a silicone-based matrix component, a first filler component comprising alumina trihydrate at a content of at least about 5 wt. % and not greater than about 30 wt. % for a total weight of the silicone-based foam, a second filler component comprising perlite at a content of at least about 1 wt. % and not greater than about 15 wt. % for a total weight of the silicone-based foam, a third filler component comprising calcium carbonate at a content of at least about 1 wt. % and not greater than about 20 wt. % for a total weight of the silicone-based foam, and a fourth filler component comprising zinc borate at a content of at least about 1 wt. % and not greater than about 10 wt. % for a total weight of the silicone-based foam, wherein the silicone-based foam comprises a V-0 flammability rating as measured according to ASTM D3801.

19. The silicone-based foam of claim 18, wherein the component B comprises a silicone-based matrix component content of at least about 20 wt. % for a total weight of the component B.

20. The silicone-based foam of claim 18, wherein the component B comprises a silicone-based matrix component content of not greater than about 50 wt. % for a total weight of the component B.

* * * * *